(12) United States Patent
Toda et al.

(10) Patent No.: US 6,520,683 B2
(45) Date of Patent: Feb. 18, 2003

(54) SEAL RING, SEALING DEVICE AND ROLLING BEARING INCLUDING THE SAME

(75) Inventors: Kazutoshi Toda, Osaka (JP); Minoru Sentoku, Nara (JP); Hirokazu Arai, Nara (JP); Fumiaki Kasahara, Osaka (JP); Tomomitsu Tamura, Tokushima (JP)

(73) Assignees: Koyo Seiko Co., Ltd., Osaka (JP); Koyo Sealing Techno Co., Ltd., Tokushima (JP)

( * ) Notice: Subject to any disclaimer, the term of this patent is extended or adjusted under 35 U.S.C. 154(b) by 0 days.

(21) Appl. No.: 09/874,603

(22) Filed: Jun. 5, 2001

(65) Prior Publication Data

US 2001/0051010 A1 Dec. 13, 2001

(30) Foreign Application Priority Data

Jun. 13, 2000 (JP) ........................................ 2000-176544

(51) Int. Cl.[7] .............................................. F16C 19/08
(52) U.S. Cl. ....................................................... 384/448
(58) Field of Search ................................. 384/448, 446, 384/544, 589; 324/174

(56) References Cited

U.S. PATENT DOCUMENTS

| 4,946,295 | A | 8/1990 | Hajzler |
| 4,948,277 | A | 8/1990 | Alff |
| 4,968,156 | A | 11/1990 | Hajzler |
| 5,195,830 | A | 3/1993 | Caillault et al. |

FOREIGN PATENT DOCUMENTS

JP 59164457 A 9/1984

Primary Examiner—Lenard A. Footland
(74) Attorney, Agent, or Firm—Jordan and Hamburg LLP

(57) ABSTRACT

A seal ring attached to a shoulder portion of a bearing ring of a rolling bearing, and including an annular body, a pulsar ring bonded to a required position of the annular body by vulcanization forming, a first lip made of magnetized rubber and formed integrally with one surface of the pulsar ring and a second lip bonded to the other surface of the pulsar ring by vulcanization molding.

21 Claims, 2 Drawing Sheets

SEAL RING, SEALING DEVICE AND ROLLING BEARING INCLUDING THE SAME

BACKGROUND OF THE INVENTION

1. Field of the Invention

The present invention relates to a seal ring, a sealing device and a rolling bearing including the same.

2. Description of the Related Art

The inventor of the present invention newly developed a wheel speed detector for controlling the antilock brake of an automobile as shown in FIGS. 3 and 4. This detector is integrated into a sealing device 102 installed to a double-row rolling bearing 101 for wheel support. The detector detects a wheel speed using a magnetic sensor 111 and a pulsar ring 113. The sealing device 102 is comprised of the first seal ring 103 and the second seal ring 104.

The first seal ring 103 is attached to the outer ring side of the bearing 101 and constituted by attaching lips 106 and 107 to an annular body 105.

The second seal ring 104 is attached to the inner ring side of the bearing 101 and constituted by attaching lips 109 and 110 to an annular body 108.

The magnetic sensor 111 is molded on the outer periphery of the annular body 105 of the first seal ring 103 by a resin member 112. The pulsar ring 113 is bonded to the inner periphery of the annular body 108 of the second seal ring 104 at a position at which the ring 113 faces the magnetic sensor 111 in diameter direction.

The pulsar ring 113 is formed by forming rubber containing magnetic powder by vulcanization. The pulsar ring 113 is magnetized in a manner, for example, in which the polarity of the ring 113 is changed alternately in circumferential direction.

At the first stage of manufacturing the second seal ring 104, the pulsar ring 113 is bonded to the annular body 108 by vulcanization forming. At the second stage thereof, the axial lip 109 and radial lip 110, both made of rubber, are bonded to the inner side surface and the outer peripheral surface of the pulsar ring 113, respectively, by vulcanization forming.

In the above case, the lips 109 and 110 of the second seal ring 104 are provided on the inner side surface and the outer peripheral surface of the pulsar ring 113, respectively, at positions away from each other. Due to this, there is a possibility that the pulsar ring 113 is disadvantageously shifted by molten rubber inflow pressure during the vulcanization forming of the second stage. It is, therefore, difficult to control vulcanization conditions.

SUMMARY OF THE INVENTION

The main object of the present invention is, therefore, to provide a seal ring capable of preventing the positional shift of a pulsar ring in the course of vulcanization-forming lips.

The other objects of the present invention as well as features and advantages thereof will become clear from the description which follows.

In short, the present invention is a seal ring attached to a shoulder portion of a bearing ring of a rolling bearing, and comprising an annular body; a pulsar ring made of magnetized rubber, and bonded to a required position of the annular body by vulcanization forming; a first lip made of magnetized rubber, and formed integrally with the pulsar ring; and a second lip bonded to the pulsar ring by vulcanization forming.

It is preferable that the pulsar ring has different magnetic poles alternately in circumferential direction provided on an outside diameter surface of the pulsar ring.

It is preferable that the pulsar ring is formed by mixing magnetic powder with rubber, and that a content of the magnetic powder in the rubber is set to fall within a range between a lower limit of 60 mass % and an upper limit of 90 mass %.

It is preferable that the annular body includes a cylindrical portion fixed to an inner ring provided at the rolling bearing; and a disk portion directed outward in diameter direction on an axially one end portion of the cylindrical portion, that the pulsar ring is bonded to an inner surface of the disk portion, that the first lip is formed integrally with the outer peripheral surface of the pulsar ring, and that the second lip is bonded to an inner side surface of the pulsar ring.

BRIEF DESCRIPTION OF THE DRAWINGS

These and other objects as well as advantages of the invention will become clear by the following description of preferred embodiment of the invention with reference to the accompanying drawings, wherein.

In all these figures, like components are indicated by the same numerals.

DETAILED DESCRIPTION OF PREFERRED EMBODIMENT

Figure 1:
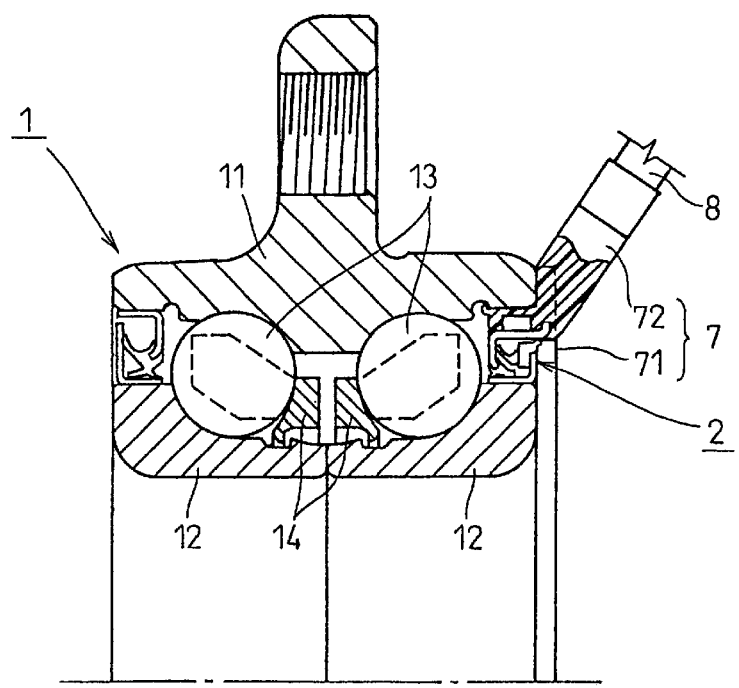
FIG. 1 is a cross-sectional view showing the upper half of a rolling bearing according to the preferred embodiment of the present invention.
Figure 2:
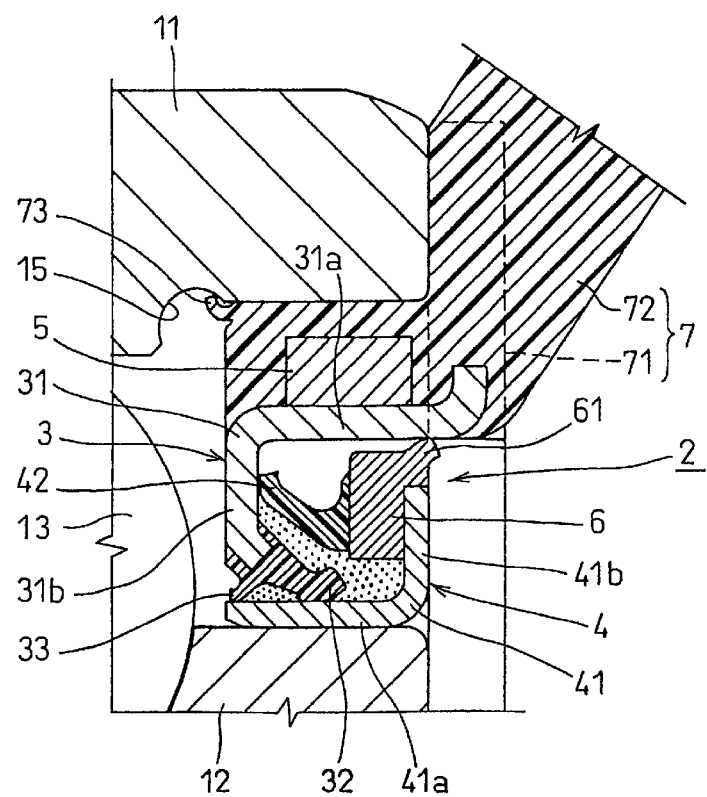
FIG. 2 is an enlarged view of a sealing device provided at the rolling bearing shown in FIG. 1.
Figure 3:
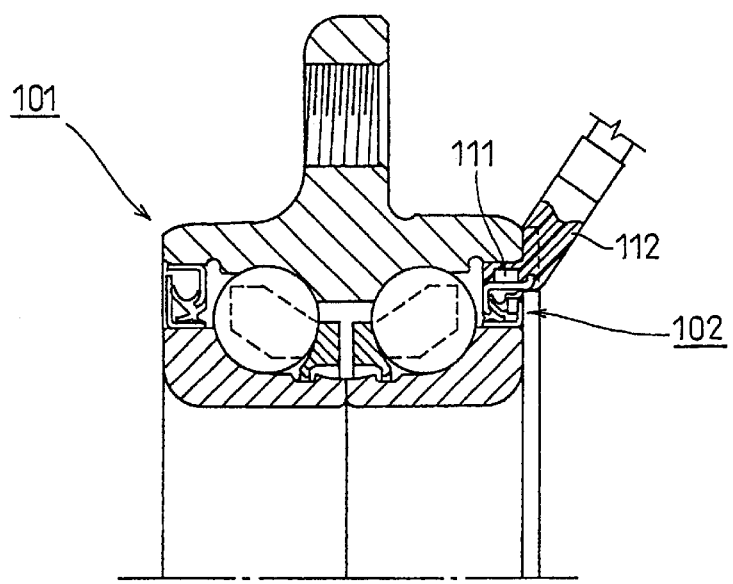
FIG. 3 is a cross-sectional view showing the upper half of a rolling bearing contrived by the inventor of the present invention.
Figure 4:
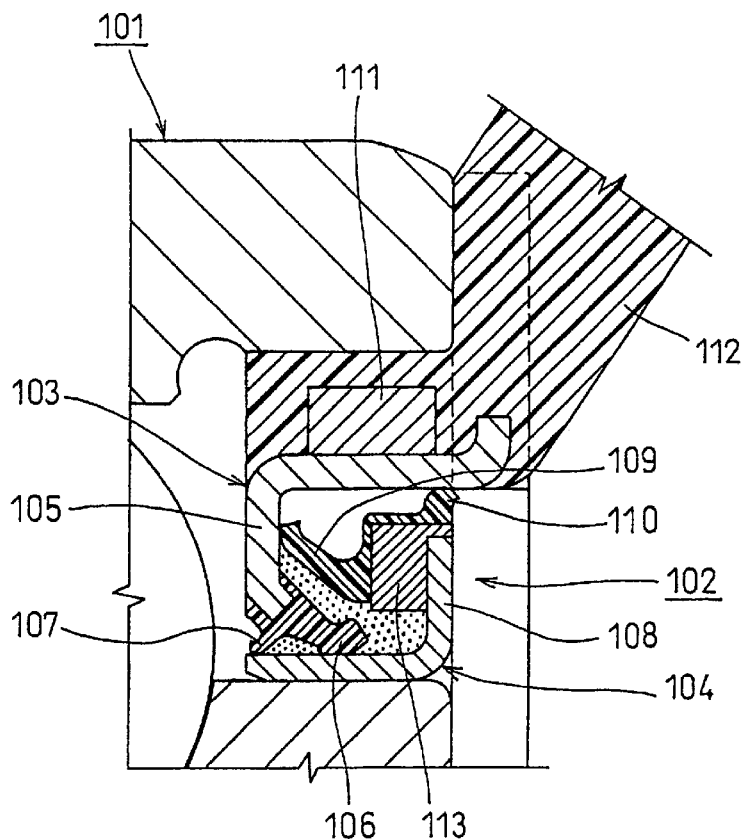
FIG. 4 is an enlarged view of a sealing device provided at the rolling bearing shown in FIG. 3.

A rolling bearing according to a preferred embodiment of the present invention will be described in detail hereinafter with reference to FIGS. 1 and 2.

A double-row rolling bearing 1 for wheel support is provided with a single outer ring 11, inner rings 12 arranged in two rows adjacent each other in axial direction, a plurality of balls 13 interposed between the outer ring 11 and each of the inner rings 12, and two snap cages 14 rotatably holding the plural balls 13.

A sealing device 2 is comprised of a first seal ring 3 and a second seal ring 4.

The first seal ring 3 is attached to the outer ring 11 side of the bearing 1.

The first ring 3 is comprised of an annular body 31, a main lip 32 and an auxiliary lip 33. These lips firmly adheres annularly to the annular body 31.

The annular body 31 has an axially cylindrical portion 31a and a disk portion 31b provided on the axially inner end side of the cylindrical portion 31a and directed radially inward.

The second seal ring 4 is attached to the inner ring 12 side of the bearing 1.

The second seal ring 4 is comprised of an annular body 41 and an axial lip 42. The axial lip 42 firmly adheres annularly to the annular body 41.

The annular body 41 has an axially cylindrical portion 41a and a disk portion 41b provided on the axially outer end side of the cylindrical portion 41a and directed radially outward.

It is preferable that both the annular bodies 31 and 41 are made of metal. They may be made of hard resin. These lips 32, 33 and 42 are mainly formed out of nitride rubber (NBR) or the other rubber.

A magnetic sensor 5 is formed out of, for example, a semiconductor circuit, preferably a Hall-effect element. The magnetic sensor 5 is provided integrally with the first seal ring 3.

A pulsar ring 6 is constituted to have different magnetic poles arranged on the outside diameter surface of the ring 6 alternately in circumferential direction. The pulse ring 6 is provided integrally with the second seal ring 4. The pulsar ring 6 is formed by vulcanization-forming rubber containing magnetic powder.

The content of the magnetic powder in the rubber constituting the pulsar ring 6 is preferably set to have a lower limit value of 60 mass % and an upper limit value of 90 mass %. By so setting, it is possible to secure a sufficient magnetic force and to maintain the elastic force of the rubber so as to hold lip performance.

If the content of the magnetic powder in the pulsar ring 6 is less than the lower limit value of 60 mass %, the pulsar ring 6 cannot obtain a sufficient magnetic force. If the content of the magnetic powder in the pulsar ring 6 exceeds the upper limit value of 90 mass %, the rubber is hardened and lip performance deteriorates.

To be specific, the magnetic sensor 5 is molded by a resin member 7 while being mounted on the outer peripheral surface of the cylindrical portion 31a of the annular body 31 of the first seal ring 3.

The resin member 7 is provided with an annular plate portion 71 for positioning the magnetic sensor 5 with respect to the shoulder portion of the outer ring 11 in axial direction, a convex portion 72 for attaching thereto a signal line 8 connected to the magnetic sensor 5 and a protrusion 73 for preventing the resin member 7 from axially detaching from the outer ring 11.

The resin member 7 is formed out of, for example, engineering plastic such as polyphenylene sulfide (PPS), polybutylene terephthalate (PBT) or polyamide (PA).

The pulsar ring 6 is fixed to the inner side surface of the disk portion 41b of the annular body 41 of the second seal ring 4 at a position at which the ring 6 faces the magnetic sensor 5 in radial direction.

A radial lip 61 is formed integrally with the outside shoulder portion of the outer peripheral surface of the pulsar ring 6. This radial lip 61 is constituted by mixing magnetic powder with rubber and magnetizing the magnetic powder.

The resin member 7 of the first seal ring 3 is tight fitted to the shoulder portion of the outer ring 11. The annular body 41 of the second seal ring 4 is tight fitted to the shoulder portions of the inner rings 12. The first seal ring 3 is prevented from detaching in axial direction by snap-fitting the protrusion 73 of the resin member 7 to a tool relief groove 15 provided in the corner between the bearing surface 11a and the large diameter shoulder portion 11b of the outer ring 11 during grinding.

In this embodiment, while the axial lip 42 of the second seal ring 4 into which the pulsar ring 6 is integrated is vulcanization-formed, the position of the pulsar ring 6 is prevented from being shifted.

Due to this, when vulcanization-forming the pulsar ring 6, the radial lip 61 is formed integrally with the pulsar ring 6 to thereby bond the axial lip 42 to the pulsar ring 6.

With such a structure, if the lip 42 is vulcanization-formed after vulcanization-forming the pulsar ring 6, molten rubber inflow direction can be designed relatively freely and the pulsar ring 6 can be arranged to be positioned with respect to a cavity inner wall in a metallic die, not shown, used for vulcanization forming.

In other words, since the pulsar ring 6 is positioned by the metallic die, it is possible to prevent the position of the pulsar ring 6 from being shifted by molten rubber inflow pressure. Vulcanization conditions can be, therefore, easily controlled and production efficiency and yield can be thereby improved, contributing to the reduction of production cost.

While the sealing device 2 is employed for the double-row rolling bearing 1 in this embodiment, the sealing device 2 can be employed for a rolling bearing other than the bearing 1.

While there has been described what is at present considered to be preferred embodiments of this invention, it will be understood that various modifications may be made therein, and it is intended to cover, in the appended claims all such modifications as fall within the true spirit and scope of this invention.

What is claimed is:

1. A seal ring attached to a shoulder portion of a bearing ring of a rolling bearing, comprising:
   an annular body;
   a pulsar ring made of magnetized rubber, and bonded to a required position of said annular body by vulcanization forming;
   a first lip made of magnetized rubber, and formed integrally with said pulsar ring; and
   a second lip bonded to said pulsar ring by vulcanization forming.

2. A seal ring according to claim 1, wherein
   said pulsar ring has different magnetic poles alternately in circumferential direction provided on an outside diameter surface of said pulsar ring.

3. A seal ring according to claim 1, wherein
   said pulsar ring is formed by mixing magnetic powder with rubber, and a content of the magnetic powder in said rubber is set to fall within a range between a lower limit of 60
   mass % and an upper limit of 90
   mass %.

4. A seal ring according to claim 1, wherein
   said annular body includes a cylindrical portion fixed to outer peripheral surfaces of an inner rings provided at said rolling bearing, and a disk portion directed outward in radial direction on an axial one end portion of said cylindrical portion; and
   said pulsar ring is bonded to an inner surface of said disk portion.

5. A sealing device attached to shoulder portions of an outer ring and inner rings, respectively, provided at a rolling bearing, comprising:
   a first seal ring attached to said outer ring; and
   a second seal ring attached to said inner rings, wherein
   said first seal ring includes:
      a first annular body;
      a magnetic sensor attached to an outer peripheral surface of said first annular body; and
      a resin member resin-molding said magnetic sensor, and wherein said second seal ring includes:
      a second annular body;
      a pulsar ring bonded to a position of said second annular body by vulcanization forming, the pulsar ring facing said magnetic sensor at said position;

a first lip made of magnetized rubber, formed integrally with the pulsar ring at a required posit ion of said pulsar ring, and contacted with an inner peripheral surface of the first annular body of said first seal ring; and a second lip bonded to a required position of said pulsar ring by vulcanization forming, and contacted with the inner peripheral surface of the first annular body of said first seal ring.

6. A sealing device according to claim 5, wherein said pulsar ring is formed by mixing magnetic powder with rubber, and a content of the magnetic powder in said rubber is set to fall within a range between a lower limit of 60 mass % and an upper limit of 90 mass %.

7. A sealing device according to claim 5, wherein said resin member of said first seal ring has an annuls ring portion for positioning said magnetic sensor with respect to the shoulder portion of said outer ring in axial direction.

8. A sealing device according to claim 5, wherein said resin member of said first seal ring has an annulus ring portion for positioning said magnetic sensor with respect to the shoulder portion of said outer ring in axial direction, and a convex portion for attaching a signal line connected to said magnetic sensor.

9. A sealing device according to claim 5, wherein said resin member of said first seal ring has a protrusion for preventing said first seal ring from detaching in axial direction by being engaged with a tool relief groove provided on an inner peripheral surface of said outer ring.

10. A sealing device according to claim 5, wherein the first annular body of said first seal ring includes:
  a cylindrical portion arranged along an axial direction of said outer ring; and
  a disk portion directed inward in diameter direction on an axially inner end side of said cylindrical portion,
  said magnetic sensor is molded by said resin member while being attached to an outer peripheral surface of said cylindrical portion of said first seal ring,
  said first lip of said second seal ring is contacted with an inner peripheral surface of said cylindrical portion of said first annular body, and
  said second lip of said second seal ring is contacted with an inner side surface of said disk portion of said first annular body.

11. A sealing device according to claim 5, wherein said second annular body of said second seal ring includes:
  a cylindrical portion having an outer peripheral surface fixed to said inner rings of said rolling bearing; and
  a disk portion directed outward in diameter direction on an axially outer end portion of said cylindrical portion, and
  said pulsar ring is bonded to an inner side surface of said disk portion of said second annular body.

12. A rolling bearing comprising:

an outer ring;

inner rings provided coaxially with the outer ring inside said outer ring;

a plurality of balls interposed between said inner rings and said outer ring;

a cage rotatably holding said plurality of balls;

a sealing device, attached to shoulder portions of said inner and outer ring, respectively, for sealing said inner rings from and to said outer ring;

a magnetic sensor; and a pulsar ring, wherein said sealing device comprises:
  a first seal ring having a first annular body and attached to said outer ring, said magnetic sensor molded by a resin member on an outer peripheral surface of the first annular body; and
  a second seal ring having a second annular body and attached to said inner ring, said pulsar ring bonded to a position at which said pulsar ring faces said magnetic sensor, by vulcanization forming, wherein said sealing device further comprises:
  a first lip formed integrally with said pulsar ring, and contacted with an inner peripheral surface of the first annular body of said first seal ring; and
  a second lip bonded to a required position of said pulsar ring by vulcanization forming, and contacted with the inner peripheral surface of the first annular body of the first seal ring.

13. A rolling bearing according to claim 12, wherein said pulsar ring is made of magnetized rubber, and having different magnetic poles alternately in circumferential direction provided on an outside diameter surface of said pulsar ring.

14. A rolling bearing according to claim 12, wherein said pulsar ring is formed by mixing magnetic powder with rubber, and a content of the magnetic powder in said rubber is set to fall within a range between a lower limit of 60 mass % and an upper limit of 90 mass %.

15. A rolling bearing according to claim 12, wherein said resin member of said first seal ring is tight fitted to the shoulder portion of said outer ring.

16. A rolling bearing according to claim 12, wherein said second annular body of said second seal ring is tight fitted to the shoulder portions of said inner rings.

17. A rolling bearing according to claim 12, wherein said resin member of said first seal ring has an annulus ring portion for positioning said magnetic sensor with respect to the shoulder portion of said outer ring in axial direction.

18. A rolling bearing according to claim 12, wherein said first annular body of said first seal ring includes:

a cylindrical portion arranged along an axial direction of said outer ring; and
  a disk portion directed inward in diameter direction on an axially inner end side of said cylindrical portion, said first lip of said second seal ring is contacted with an inner peripheral surface of said cylindrical portion of said first annular body, and said second lip of said second seal ring is contacted with an inner side surface of said disk portion of said first annular body.

19. A rolling bearing according to claim 12, wherein said second annular body of said second seal ring includes:

a cylindrical portion having an inner peripheral surface fixed to said inner rings of said rolling bearing; and
  a disk portion directed outward in diameter direction on an axially outer end portion of said cylindrical portion, and said pulsar ring is bonded to an inner side surface of said disk portion of said second annular body.

20. A rolling bearing according to claim 12, wherein said resin member of said first seal ring has an annulus ring for positioning said magnetic sensor with respect to the shoulder portion of said outer ring in axial direction, and a convex portion for attaching a signal line connected to said magnetic sensor.

21. A rolling bearing according to claim 12, wherein a tool relief groove is provided on an outer peripheral surface of said outer ring; and said resin member of said first seal ring has a protrusion for preventing the first seal ring from detaching in axial direction by being engaged with said tool relief groove.

* * * * *